Patented July 16, 1940

2,207,803

UNITED STATES PATENT OFFICE 2,207,803

CYCLOHEXANE SULPHONAMIDE - FORMALDEHYDE RESINS AND METHODS OF PREPARING SAME

Julian Werner Hill, Wilmington, Del., assignor to E. I. du Pont de Nemours & Company, Wilmington, Del., a corporation of Delaware No Drawing. Application February 18, 1939, Serial No. 257,176

10 Claims. (Cl. 260—72)

This invention relates to certain new and useful synthetic resins and methods of preparing same.

It is well known that certain sulphonamides react with formaldehyde to form resins. Thus, for example, toluene sulphonamide and formaldehyde react to produce a resin which is useful for various purposes; e. g., as a component of a moisture-proofing composition for regenerated cellulose film and for the making of heat sealing lacquers to be used thereon.

This invention has as an object the preparation of a resin which has markedly improved bonding properties when used for heat sealed bonds of regenerated cellulose film. Another object is the preparation of new and useful resins. Still another object is to provide a process for the preparation of these new and useful resins. Other objects will be apparent from a reading of the following description.

These objects are accomplished by reacting formaldehyde with a cyclohexanesulphonamide having at least one amido hydrogen. The resinous product produced is new and useful and has properties which clearly distinguish it from resins of the aromatic sulphonamide-formaldehyde type.

In carrying out the process of this invention in its preferred form, a cyclohexanesulphonamide having at least one amido hydrogen is mixed with about one to two mols of formaldehyde in aqueous solution and heated in the presence of a catalyst until condensation takes place to the desired degree. Instead of formaldehyde, paraformaldehyde, trioxymethylene, polyoxymethylene, etc., may be used. The resins thus obtained range from very viscous fluids to relatively brittle solids and range in color from light yellow to colorless. The solids soften when warmed and are usually fluid at 100° C. The yields are substantially quantitative.

The following examples set forth certain well defined instances of the application of this invention. They are, however, not to be considered as limitations thereof since many modifications may be made without departing from the spirit and scope of this invention.

Example 1

One hundred parts of cyclohexanesulphonamide, 45 parts of 37% aqueous formaldehyde, and 1.2 parts of phthalic anhydride are put in a container provided with reflux condenser and heated to reflux for 1½ hours. The water is then removed by heating at 50° C. under vacuum for several hours. The product is a soft, clear, pale yellow resin, which flows slowly at 50° C. The yield is 106 parts. On longer heating a product is obtained which is hard when cold and more viscous when warmed.

Example 2

One hundred parts of cyclohexanesulphonamide, 45 parts of 37% aqueous formaldehyde, and 1.2 parts of phthalic anhydride are put in a container provided with reflux condenser and heated to reflux for four hours. The water is then removed by vacuum distillation at 50° C. for several hours. The product is a clear, pale yellow resin which on cooling becomes a brittle solid.

Example 3

Sixteen and three-tenths parts of cyclohexanesulphonamide, 3 parts of trioxymethylene, and 0.4 part of phthalic anhydride are placed in a container provided with a reflux condenser and heated in an oil bath at 100° to 110° C. for ten hours. On cooling, the product is an opaque, pale yellow, plastic mass.

Example 4

Twelve parts of cyclohexane-1,4-disulphonamide are dissolved in 20 parts of 37% formaldehyde solution. One-half part of phthalic anhydride is added and the reaction mixture is heated under reflux for two hours. The water is distilled under vacuum, leaving the product as a light-colored, viscous polymer.

Example 5

Eleven parts of N-isobutylcyclohexanesulphonamide, 15 parts of 37% formaldehyde solution, and 2.5 parts of concentrated hydrochloric acid are placed in a container provided with a reflux condenser and heated to reflux over a free flame for 24 hours. The water is then removed by heating under vacuum at 50° for several hours. The product is a pale amber colored, viscous, sirupy liquid. A few crystals of unreacted N-isobutylcyclohexanesulphonamide form in the resin on standing.

Example 6

Twelve parts of N-phenylcyclohexanesulphonamide, 5 parts of 37% formaldehyde solution, and 0.35 part of phthalic anhydride are placed in a container provided with reflux condenser and heated over a free flame for 13 hours. The very viscous, red-brown resin is washed several times with water by decantation and then heated under vacuum at 50° C. for several hours. The product is a red-brown resin which flows only very slowly at room temperature. On standing, crystals of unreacted N-phenylcyclohexanesulphonamide form in the resin.

The process of this invention is generally applicable to cyclohexanesulphonamides containing at least one amido hydrogen atom. Examples of such compounds are N-methyl-cyclohexanesulphonamide, N-ethylcyclohexanesulphonamide, N-hexyl-cyclohexanesulphonamide, N-dodecyl-cyclohexanesulphonamide, N-octadecylcyclohexanesulphonamide, N - cyclohexylcyclohexanesulphonamide, N - p - tolylcyclohexanesulphonamide, N-beta-naphthyl-cyclohexanesulphonamide, and N-alphanaphthylcyclohexanesulphonamide, as well as cyclohexanedisulphonamides and derivatives. Valuable resins may also be obtained by using suitable mixtures of various cyclohexanesulphonamides and N-substituted cyclohexanesulphonamides.

The reaction of these cyclohexanesulphonamides with formaldehyde may be conducted either in the presence or absence of catalytic agents. Any suitable acid catalyst for the reaction may be used, such as phthalic anhydride, hydrochloric acid, sulphuric acid, phosphoric acid, zinc chloride, zinc sulphate, acetic acid, etc. Suitable alkaline catalysts include sodium carbonate, borax, etc. Mixtures of catalysts may be useful in certain instances.

In preparing the products of this invention, various other procedures can be followed in addition to those described. For example, the temperature at which the condensation is carried out may be varied from about 50° C. up to the temperature at which refluxing occurs provided the time of treatment is adjusted to compensate for the difference in reaction rate. When solid aldehydes are used, such as paraformaldehyde, trioxymethylene, polyoxymethylene, etc., the temperature may be increased to any suitable degree provided it is kept below the decomposition point. Improved products may be obtained by carrying out the condensation at a moderate temperature and then subjecting the formed resin to more severe heat treatment, in some cases heating to temperatures as high as 200° to 300° C. The reaction between the sulphonamide and formaldehyde may be continued for a period varying from a few minutes to many hours depending on the degree of condensation desired. The length of time of the reaction determines to a considerable extent the properties of the products obtained. For example, a product prepared by heating for only a short period tends to be a soft and somewhat fluid resin. When the condensation is continued for a longer time, the product is generally harder and more brittle.

Where necessary or desired, the reaction or subsequent heat treatment may be carried out in closed vessels under pressure. Improved products are obtained in many cases by blanketing the reaction mixture with inert gases such as nitrogen or carbon dioxide. Suitable solvents may also be used as media for carrying out the reaction. Examples of suitable solvents are water, alcohols such as methanol, ethanol, butanol, etc., aromatic or aliphatic hydrocarbons such as benzene, toluene, xylene, petroleum ether, hexane, etc., chlorinated hydrocarbons, etc.

Useful variations in the products can be made by using various proportions of the reactants. Thus a fraction of a mol up to several mols of aldehyde may be used for each mol of sulphonamide. Improved products may also be obtained by reacting a mol of formaldehyde with a mol of amide in the specified manner, and then treating the formed resin with additional amounts of formaldehyde or amide under the influence of heat.

Purification of the cyclohexanesulphonamide-formaldehyde resins may be accomplished in various ways. In many cases the removal of the solvent by distillation is the only purification required. It may be desirable, however, to wash the resins with water or other suitable solvents to remove unreacted formaldehyde and amide. Use may also be made of solvents in which the resins dissolve and the impurities remain undissolved. Treatment with decolorizing charcoal or similar agents is sometimes advantageous. Where an aqueous medium is used, the water can be removed either by decantation or by distillation, and if desired the product may be washed with water by decantation or purified by the use of solvents or treatment with decolorizing carbon. The product is finally dried by heating to a suitable temperature, such as 50° C., under vacuum.

The products of this invention are useful as ingredients of coating compositions and as plasticizers for resinous materials, especially as plasticizers for cellulose derivatives, such as cellulose acetate, cellulose nitrate, etc. They are particularly valuable in compositions for coating films of cellulose such as regenerated cellulose film, to make the films moisture-proof and heat-sealable.

Although the reaction of sulphonamides with formaldehyde to form resins is well known to the art, the application of the reaction to these cyclohexanesulphonamides is new, and yields improved products. For example, in lacquer compositions for making regenerated cellulose film moisture-proof and heat-sealable, it is found that compositions containing cyclohexanesulphonamide-formaldehyde resins produce a heat-sealed bond considerably superior in strength to that obtained with compositions containing toluenesulphonamide-formaldehyde resins.

Following are the results of tests on heat-sealed bonds of regenerated cellulose film treated with compositions containing cyclohexanesulphonamide-formaldehyde resins compared to toluenesulphonamide-aldehyde resins. The numerical values represent grams necessary to break the bond in a standard testing machine.

| Percent of test resin in lacquer composition | Toluene-sulphonamide-formaldehyde resin | Cyclohexane-sulphonamide-formaldehyde resin |
| --- | --- | --- |
| 5 | 26 | 114 |
| 8 | 42 | 61 |
| 10 | 33 | 169 |

It is apparent from these data that these alicyclic sulphonamide formaldehyde resins are superior to aromatic sulphonamide-formaldehyde resins for use in heat-sealing lacquers for regenerated cellulose film.

The term "formaldehyde," as used herein and in the claims is defined to include not only monomeric formaldehyde but also the well known formaldehyde equivalents such as paraformaldehyde, trioxymethylene, polyoxymethylene, etc.

It is apparent that many widely different embodiments of this invention may be made without departing from the spirit and scope thereof and therefore it is not intended to be limited except as indicated in the appended claims.

I claim:

1. A process for the preparation of synthetic resins which comprises reacting a cyclohexanesulphonamide having at least one amido hydrogen with formaldehyde.

2. A process for the preparation of synthetic resins which comprises reacting under the influence of heat, in the presence of a catalyst, formaldehyde with a cyclohexanesulphonamide having at least one amido hydrogen.

3. The process in accordance with claim 2 characterized in that the formaldehyde is present as an aqueous solution of formaldehyde.

4. As a new composition of matter the resinous reaction product of a cyclohexanesulphonamide having at least one amido hydrogen with formaldehyde.

5. A process for the preparation of synthetic resins which comprises reacting under the influence of heat, in the presence of phthalic anhydride, formaldehyde with cyclohexanesulphonamide.

6. A process for the preparation of synthetic resins which comprises reacting under the influence of heat, in the presence of phthalic anhydride, formaldehyde with cyclohexane-1,4-disulphonamide.

7. A process for the preparation of synthetic resins which comprises reacting under the influence of heat, in the presence of hydrochloric acid, formaldehyde with N-isobutylcyclohexanesulphonamide.

8. As a new composition of matter a resinous reaction product of cyclohexanesulphonamide with formaldehyde.

9. As a new composition of matter a resinous reaction product of cyclohexane-1,4-disulphonamide with formaldehyde.

10. As a new composition of matter a resinous reaction product of N-isobutylcyclohexanesulphonamide with formaldehyde.

JULIAN WERNER HILL.